(12) United States Patent  (10) Patent No.: US 7,857,612 B2
Teng et al.                  (45) Date of Patent: *Dec. 28, 2010

(54) MOLDING-SYSTEM PLATEN HAVING ANTI-TILT STRUCTURE

(75) Inventors: Alex Teng, Richmond Hill (CA); Joaquim Martins Nogueira, Everett (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 493 days.

This patent is subject to a terminal disclaimer.

(21) Appl. No.: 11/848,253

(22) Filed: Aug. 31, 2007

(65) Prior Publication Data

US 2008/0175937 A1  Jul. 24, 2008

Related U.S. Application Data

(63) Continuation-in-part of application No. 11/626,750, filed on Jan. 24, 2007, now abandoned.

(51) Int. Cl.
*B29C 45/64* (2006.01)

(52) U.S. Cl. .......................... 425/472; 425/595

(58) Field of Classification Search ............. 425/451.9, 425/472, 595
See application file for complete search history.

(56) References Cited

U.S. PATENT DOCUMENTS

| | | | | |
|---|---|---|---|---|
| 3,302,556 | A * | 2/1967 | Durbin | 100/214 |
| 4,530,655 | A * | 7/1985 | Hehl | 425/589 |
| 4,573,901 | A * | 3/1986 | Hehl | 425/450.1 |
| 5,123,834 | A * | 6/1992 | Joyner | 425/592 |
| 5,188,850 | A * | 2/1993 | Hirata et al. | 425/589 |
| 5,354,196 | A * | 10/1994 | Ziv-Av | 425/589 |
| 5,593,711 | A | 1/1997 | Glaesener | |
| 5,776,402 | A | 7/1998 | Glaesener | |
| 6,027,329 | A | 2/2000 | Nazarian et al. | |
| 6,328,553 | B1 * | 12/2001 | Joyner et al. | 425/595 |
| 6,439,876 | B1 | 8/2002 | Glaesener | |
| 6,746,232 | B2 * | 6/2004 | Becker et al. | 425/595 |
| 6,896,508 | B2 * | 5/2005 | Kruger et al. | 425/595 |
| 6,984,121 | B2 | 1/2006 | Fischbach et al. | |
| 7,080,978 | B2 | 7/2006 | Glaesener | |

(Continued)

FOREIGN PATENT DOCUMENTS

WO     WO03084731 A1   10/2003

(Continued)

*Primary Examiner*—James Mackey
(74) *Attorney, Agent, or Firm*—Husky Intellectual Property Services

(57) ABSTRACT

Disclosed are: (i) a platen of a molding-system having anti-tilt structure, (ii) a molding system having a platen including an anti-tilt structure, (iii) a component of a platen of a molding system having a frame, the component including an anti-tilt structure, (iv) a clamp of a molding system, the clamp having platens each including an anti-tilt structure, (v) a molded article manufactured by usage of a platen of a molding system having an anti-tilt structure, (vi) a molded article manufactured by usage of a molding system having a platen including an anti-tilt structure, (vii) a molded article manufactured by usage of a component of a platen of a molding system having a frame, the component including an anti-tilt structure, and (viii) a molded article manufactured by usage of a clamp of a molding system, the clamp having platens each including an anti-tilt structure.

1 Claim, 15 Drawing Sheets

U.S. PATENT DOCUMENTS

| | | | |
|---|---|---|---|
| 7,318,721 B2 * | 1/2008 | Spicer et al. | 425/472 |
| 7,351,055 B2 * | 4/2008 | Yoshioka | 425/595 |
| 7,452,495 B2 * | 11/2008 | Spicer et al. | 425/472 |
| 7,491,051 B2 * | 2/2009 | Matsushita et al. | 425/595 |
| 2002/0022069 A1 * | 2/2002 | Kasal et al. | 425/593 |
| 2004/0208950 A1 | 10/2004 | Glaesener | |
| 2006/0269653 A1 * | 11/2006 | Yoshioka | 425/595 |
| 2007/0187871 A1 * | 8/2007 | Nagata et al. | 425/190 |

FOREIGN PATENT DOCUMENTS

WO     2006/115141 A1     11/2006

* cited by examiner

US 7,857,612 B2

MOLDING-SYSTEM PLATEN HAVING ANTI-TILT STRUCTURE

RELATED APPLICATIONS

This patent application is a continuation in part patent application of prior U.S. patent application Ser. No. 11/626,750, filed Jan. 24, 2007 now abandoned. This patent application also claims the benefit and priority date of prior U.S. patent application Ser. No. 11/626,712, filed Jan. 24, 2007 and U.S. patent application Ser. No. 11/626,661, filed Jan. 24, 2007. Platens are discussed in the Applicant's related application entitled: MOLDING-SYSTEM PLATEN HAVING ANTI-TILT STRUCTURE, which was filed concurrently with the present application.

TECHNICAL FIELD

The present invention generally relates to, but is not limited to, molding systems, and more specifically the present invention relates to, but is not limited to, (i) a platen of a molding-system having anti-tilt structure, (ii) a molding system having a platen including an anti-tilt structure, (iii) a component of a platen of a molding system having a frame, the component including an anti-tilt structure, (iv) a clamp of a molding system, the clamp having platens each including an anti-tilt structure, (v) a molded article manufactured by usage of a platen of a molding system having an anti-tilt structure, (vi) a molded article manufactured by usage of a molding system having a platen including an anti-tilt structure, (vii) a molded article manufactured by usage of a component of a platen of a molding system having a frame, the component including an anti-tilt structure, and (viii) a molded article manufactured by usage of a clamp of a molding system, the clamp having platens each including an anti-tilt structure.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

U.S. Pat. No. 5,593,711 (Inventor: Glaesener; Publication Date: 1997 Jan. 14) discloses a platen for transmitting a clamping force while preventing end face bending by using an intermediate structure distributing forces from edges of one end face to a centre of the other end face. More specifically, this patent appears to disclose a platen for use in a clamping operation wherein a force is generated having a first direction. The platen includes a first wall having edges and a center area and at least first and second sides. The first side is adapted to be positioned nearest the clamping operation. The platen further includes a second wall spaced from and substantially parallel to the first wall. The first wall and the second wall extend substantially transverse to the first direction of the force. An intermediate support structure is positioned between the walls and is used to direct the force from the edges of the first wall toward the center area of the first wall for substantially preventing non-uniform deflection of the first wall along the first side.

U.S. Pat. No. 5,776,402 (Inventor: Glaesener; Publication Date: 1998 Jul. 7) discloses a process of distributing forces within a platen by generating force against sidewalls in a first direction and directing force from one of the sidewalls solely towards the other of the sidewalls. More specifically, this patent appears to disclose an injection molding machine that includes: (i) a stationary platen having a first mold half, (ii) at least one moveable platen having a second mold half for forming a mold with the first mold half, (iii) tie bars for guiding the moveable platen relative the stationary platen, and (iv) an injection unit for injecting molten resin into the mold. For at least one of the stationary and moveable platen, a force is generated during clamping having a first direction. The at least one stationary and moveable platens includes a first wall having edges and a central area and at least first and second sides, wherein the first side is adapted to be positioned nearest the clamping operation. The platen further includes a second wall spaced from and substantially parallel to the first wall, wherein the first and second walls extend substantially transverse to the first direction of the force. An intermediate support structure is positioned between the walls and is used to direct the force from the edges of the first wall toward the central area of the first wall for substantially preventing non-uniform deflection of the first wall along the first side. A related process for preventing flash formation is also disclosed.

U.S. Pat. No. 6,027,329 (Inventor: Nazarian et al; Published: 2000 Feb. 22) discloses a platen with deformation-free mounting surface and with flexible structure interconnecting the platen tie bar housings and the mould support section. More specifically, this patent appears to disclose a platen to be operationally coupled to a plurality of tie bars and which is suitable for supporting a mold element in a clamping operation in which the platen is subjected to clamping forces. The platen includes a mold supporting section comprising a mold support member having a mold mounting surface for receiving the mold element. A plurality of tie bar engaging members is spaced apart from the mold supporting section. A flexible interconnecting structure comprises at least one interconnecting element which interconnects at least tie bar engaging member to the mold supporting section. The interconnecting element is placed under tension during the clamping operation to allow the tie bar engaging member to deflect upward relative to the mold supporting section in response to the clamping forces acting against the platen.

PCT Patent Number WO 03/084731A1 (Inventor: Wohlrab et al; Publication Date: 2003 Oct. 16) discloses a platen for an injection-molding machine, and the platen includes a backing frame joined to a front plate by angled ribs that meet the frame outside the tie bar holes. More specifically, this patent appears to disclose a plate for an injection molding machine, especially a closing and/or nozzle plate for receiving a tool. The plate includes: (i) a front plate section provided with a tool clamping surface, (ii) a rear plate section enabling force to be introduced into the plate, and (iii) a connecting section which connects the front and rear plate sections. The purpose of the plate is to avoid bending loads in the force-introduction areas of the plate. This is achieved by matching the front plate section, connecting section and rear plate section in terms of dimensions, design and/or arrangement in addition to the position of the areas wherein force is introduced, whereupon the flat areas in the rear plate section where force is introduced only become essentially deformed as a result of the bending load in the direction in which force is introduced.

U.S. Patent Application Number 2004/0208950A1 (Inventor: Glaesener; Publication Date: 2004 Oct. 21) discloses a platen for a molding machine, and the platen includes a support located between two planar walls having ribs arranged at non-normal angle to a first wall and the rib transmits forces from the first wall to a second wall such that bending of the second wall is resisted. More specifically, this patent appears to disclose a platen for a molding machine. The platen includes an intermediate support structure between two planar walls having ribs arranged at a non-normal angle beta to a first wall. The ribs couple forces from the first wall to the second wall in such a way that bending of the second wall is resisted. This adds to the rigidity of the second wall and hence the platen, adding to flatness of the arrangement. Gussets may be provided extending between the ribs and the intermediate support structure. This has the effect of surrounding and supporting an injection bore and further adding to the coupling of forces to the edge portions of the second wall to resist forces acting to bend the wall.

U.S. Pat. No. 6,439,876 (Inventor: Glaesener; Publication Date: 2002 Aug. 27) discloses a mold-support platen that includes spaced-apart ribs interconnecting back face, wall and front face. More specifically, this patent appears to disclose an injection molding machine that includes a moveable platen specifically adapted to uniformly distribute a clamp force to mold half surfaces thereby reducing localized deflections and unwanted flash on the molded article.

U.S. Pat. No. 6,984,121 (Inventor: Fischbach et al; Published: 2006 Jan. 10) discloses a mold clamping plate for an injection molding machine that consists of a central plate with sleeves at its corners which surround bores for spindles of spindle drive, the sleeves being only partially connected to the plate. More specifically, this patent appears to disclose a platen of an injection molding machine that includes a plate-shaped center area having corners, each corner formed with a recess. A plurality of sleeves is received in the recesses of the center area and defines bores for accommodation of column-like holding and/or guide elements. The sleeves have an outer surface in confronting relationship to the center area and are configured for only partial connection to the center area, thereby establishing an elastic connection between the center area and the sleeves.

U.S. Pat. No. 7,080,978 (Inventor: Glaesener; Published: 2006 Jul. 25) discloses a platen for a molding machine that includes support between two planar walls having ribs arranged at non-normal angle to first wall and rib couple forces from first to second wall such that bending of the second wall is resisted. More specifically, this patent appears to disclose a platen for a molding machine includes an intermediate support structure between two planar walls having ribs arranged at a non-normal angle beta to a first wall. The ribs couple forces from the first wall to the second wall in such a way that bending of the second wall is resisted. This adds to the rigidity of the second wall and hence the platen, adding to flatness of the arrangement. Gussets may be provided extending between the ribs and the intermediate support structure. This has the effect of surrounding and supporting an injection bore and further adding to the coupling of forces to the edge portions of the second wall to resist forces acting to bend the wall.

SUMMARY

According to a first aspect of the present invention, there is provided a platen of a molding system having a frame, the platen including an anti-tilt structure supportable by the frame, the anti-tilt structure connecting to a mold-support structure of the platen, and the anti-tilt structure extending from the mold-support structure.

According to a second aspect of the present invention, there is provided a platen of a molding system having a frame, the platen including: (i) a mold-support structure having a central portion, the mold-support structure having a peripheral portion surrounding the central portion, (ii) a force-receiving structure offset from the mold-support structure, (iii) an intermediate structure connecting the force-receiving structure to the central portion but disconnecting the force-receiving structure from the peripheral portion, and (iv) an anti-tilt structure supportable by the frame, the anti-tilt structure connecting to the mold-support structure, and the anti-tilt structure extending from the mold-support structure.

According to a third aspect of the present invention, there is provided a molding system, having a frame, and also having a platen including an anti-tilt structure supportable by the frame, the anti-tilt structure connecting to a mold-support structure of the platen, and the anti-tilt structure extending from the mold-support structure.

According to a fourth aspect of the present invention, there is provided a molding system, having: a frame and a platen, the platen including: (i) a mold-support structure having a central portion, the mold-support structure having a peripheral portion surrounding the central portion, (ii) a force-receiving structure offset from the mold-support structure, (iii) an intermediate structure connecting the force-receiving structure to the central portion but disconnecting the force-receiving structure from the peripheral portion, and (iv) an anti-tilt structure supportable by the frame, the anti-tilt structure connecting to the mold-support structure, and the anti-tilt structure extending from the mold-support structure.

According to a fifth aspect of the present invention, there is provided a component of a platen of a molding system having a frame, the component including an anti-tilt structure supportable by the frame, the anti-tilt structure connecting to a mold-support structure of the platen, and the anti-tilt structure extending from the mold-support structure.

According to a sixth aspect of the present invention, there is provided a component of a platen of a molding system having a frame, the platen including: (i) a mold-support structure having a central portion, the mold-support structure having a peripheral portion surrounding the central portion, (ii) a force-receiving structure offset from the mold-support structure, (iii) an intermediate structure connecting the force-receiving structure to the central portion but disconnecting the force-receiving structure from the peripheral portion, the component including an anti-tilt structure supportable by the frame, the anti-tilt structure connecting to the mold-support structure, and the anti-tilt structure extending from the mold-support structure.

According to a seventh aspect of the present invention, there is provided a clamp of a molding system having a frame, the clamp having platens each including an anti-tilt structure supportable by the frame, the anti-tilt structure connecting to a mold-support structure of the platen, and the anti-tilt structure extending from the mold-support structure.

According to a seventh aspect of the present invention, there is provided a clamp of a molding system having a frame, the clamp including: (i) tie bars each having a clamp portion and a lock portion, (ii) clamp actuators each coupled to the tie bars respectively, (iii) tie-bar lock mechanisms each lockable and unlockable to lock portions of the tie bars respectively, (iv) platens, a selected one of the platens accommodating the clamp actuators, another selected one of the platens accommodating the tie-bar lock mechanisms, and (v) a platen stroke actuator coupled to at least one of the platens, and configured to stroke the platens relative to each other, the platens each including: (a) a mold-support structure having a central portion, the mold-support structure having a peripheral portion surrounding the central portion, (b) a force-receiving structure offset from the mold-support structure, (c) an intermediate structure connecting the force-receiving structure to the central portion but disconnecting the force-receiving structure from the peripheral portion, and (d) an anti-tilt structure supportable by the frame, the anti-tilt structure connecting to the mold-support structure, and the anti-tilt structure extending from the mold-support structure.

A technical effect, amongst other technical effects, of the aspects of the present invention is improved platen operation.

DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figures 1, 16:
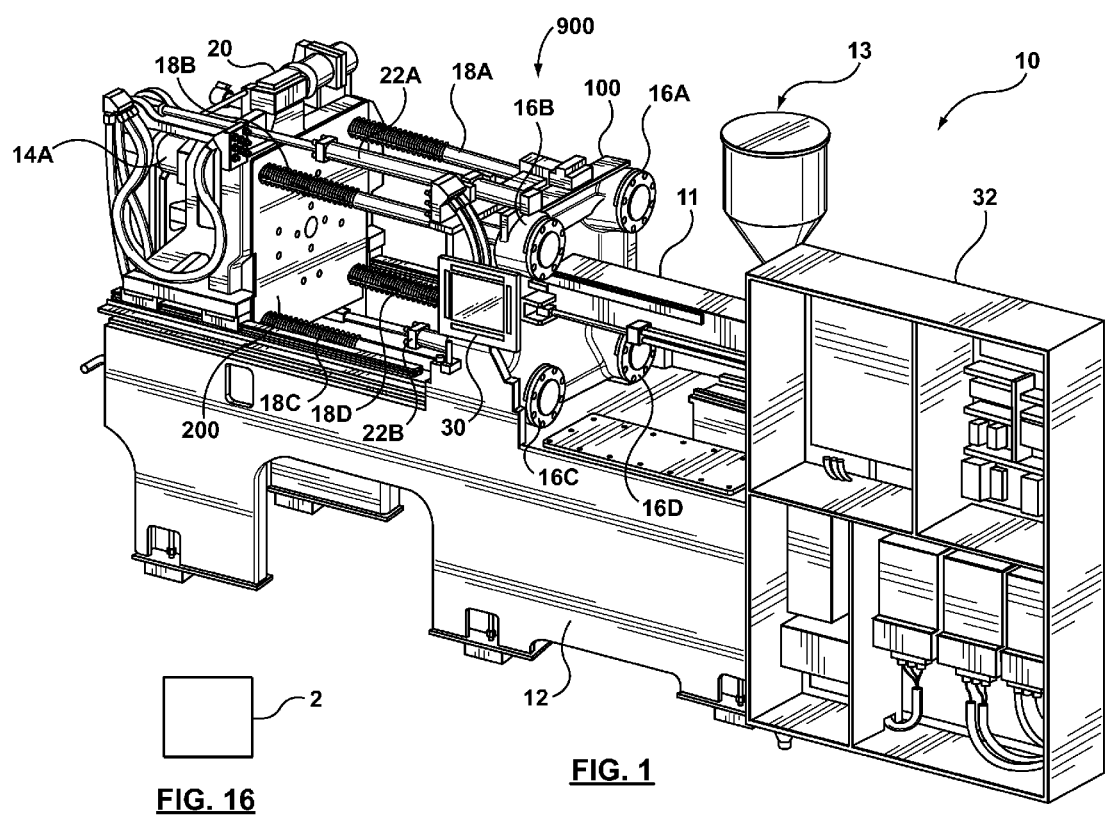
FIG. 1 is a perspective view of a molding system having a stationary platen and a movable platen according to a first exemplary embodiment.
FIG. 16 is a simplified view of a molded article.

FIG. 1 is the perspective view of a molding system 10 (hereafter referred to as the "system 10") that includes a stationary platen 100 and a moveable platen 200 according to the first exemplary embodiment. The stationary platen 100 is fixedly connected to a frame 12 of the system 10. The moveable platen 200 is slidably moveable along the frame 12. The frame 12 includes rails that permit supportable sliding movement of the platen 200. Hereafter the stationary platen 100 will be referred to as the "platen 100". Hereafter the moveable platen 200 will be referred to as the "platen 200". The system 10 includes components that are known to persons skilled in the art and these known components will not be described here; these known components are described, at least in part, in the following text books (by way of example): (i) Injection Molding Handbook by Osswald/Turng/Gramann (ISBN: 3-446-21669-2; publisher: Hanser), and (ii) Injection Molding Handbook by Rosato and Rosato (ISBN: 0-412-99381-3; publisher: Chapman & Hill).

The system 10 includes: (i) the frame 12, (ii) an injection-type extruder 11 (hereafter referred to as the "extruder 11"), (iii) a hopper 13, (iv) a clamp 900, and (iv) a control unit 32. The frame 12 is used to support the extruder 11 that has, preferably, a barrel and a reciprocating screw positioned in the barrel. The hopper 13 is coupled to the extruder 11 so as to feed pellets of moldable material to a feed throat of the extruder 11. The extruder 11 is configured to: (i) prepare the moldable material into an injectable molding material, and (ii) inject the injectable molding material into a mold cavity defined by a mold (not depicted). The clamp 900 includes, but is not limited to: (i) tie bars 18A, 18B, 18C, 18D, (ii) clamp actuators 16A, 16B, 16C, 16D, (iii) tie-bar lock mechanisms 14A, 14B, 14C, 14D, (iv) platens 100, 200, and (v) platen stroke actuators 22A, 22B. Hereafter, the tie-bar lock mechanisms 14A, 14B, 14C, 14D will be referred to as the "mechanisms 14A, 14B, 14C, 14D". Hereafter, the platen stroke actuators 22A, 22B will be referred to as the "actuators 22A, 22B". FIG. 1 depicts the mechanism 14A while the mechanisms 14B, 14C and 14D are hidden. Each tie bar 18A, 18B, 18C, 18D includes: (i) a respective clamp portion, and (ii) a respective lock portion. The lock portion of each tie bar 18A, 18B, 18C, 18D is lockably interactable with the mechanisms 14A, 14B, 14C, 14D, respectively. The mechanisms 14A, 14B, 14C, 14D are housed or supported in respective corners of the platen 200. Each lock portion includes rows of interrupted, circumferentially distributed teeth that have longitudinal grooves defined through the teeth. By way of example, the distributed teeth and longitudinal grooves of the lock portion of the tie bars 18A, 18B, 18C, 18D are described and depicted in U.S. Pat. No. 5,868,989 (Inventor: Glaesener; Published: 1999 Feb. 9). The mechanisms 14A, 14B, 14C, 14D are each lockable and unlockable relative to the lock portions of the tie bars 18A, 18B, 18C, 18D (respectively). The clamp portion of each tie bar 18A, 18B, 18C, 18D is operatively coupled to clamp actuators 16A, 16B, 16C, 16D (respectively). Each clamp actuator 16A, 16B, 16C, 16D is supported or housed in a respective corner of the platen 100. The clamp actuators 16A, 16B, 16C, 16D each have hydraulically-driven pistons, which are known in the art, and therefore will not be described with additional detail. The platen stroke actuators 22A, 22B are coupled to the platens 100, 200; the platen stroke actuators 22A, 22B are configured to stroke the platen 200 relative to the platen 100. Preferably, the actuators 22A, 22B are coupled to the platen 100 and to the platen 200, and it is understood that other arrangements may be accommodated. The control unit 32 includes processing control equipment that is interfaced to: (i) the controllable components of the system 10, and (ii) a human-machine interface 30 (hereafter referred to as the "HMI 30"). The HMI 30 is configured to permit an operator of the system 10 to monitor and/or control operations of the system 10 as may be required to permit the system 10 to manufacture a molded article 2 (FIG. 16). The molded article 2 is to be molded in the mold cavity defined by the mold. The mold includes: (i) a moveable mold portion (not depicted) that is supported by the platen 200, and (ii) a stationary mold portion (not depicted) that is supported by the platen 100. Typically, since the mold is a tool that wears down as it is used to mold articles, the worn mold is replaced with a fresh, new mold from time to time as required. A technical effect, amongst others, of the platens 100, 200 is that they are so configured so as to: (i) reduce inadvertent wear to the mold and thereby, advantageously, extend the usable life of the mold, and/or (ii) reduce wear to the components associated with the system 10 and thereby, advantageously, extend the usable life of the components of the system 10. Typically, the system 10 is sold separately from the mold.

Figure 2:
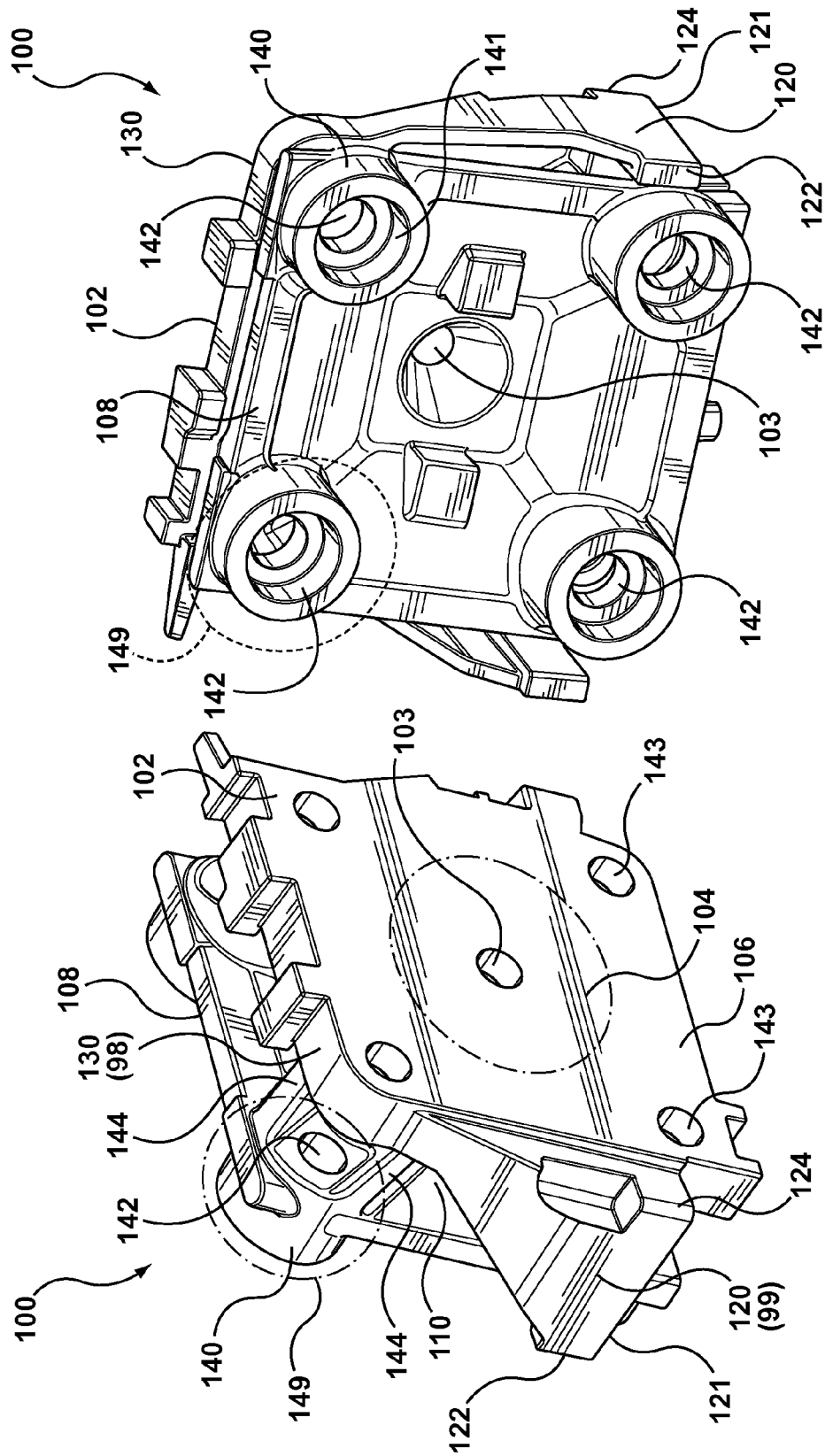
FIGS. 2A, 2B are front and back perspective views, respectively, of the stationary platen of FIG. 1 according to a second exemplary embodiment (which the preferred exemplary embodiment)

FIGS. 2A, 2B are the front and the back perspective views, respectively, of the platen 100 of FIG. 1 according to the second exemplary embodiment (which is the preferred embodiment). The platen 100 and the platen 200 share similar structures or components, and as such those similar structures or components are identified in the drawings by usage of similar component or part reference numerals; therefore, dissimilar structural elements or components that are unique to either of the platens 100, 200 are identified with dissimilar part or component numerals. The platen 100 includes: (i) a mold-support structure 102, (ii) a force-receiving structure 108, and (iii) an intermediate structure 110. Hereafter, the mold-support structure 102 will be referred to as the "structure 102". The structure 102 has: (i) a central portion 104, and (ii) a peripheral portion 106 that surrounds the central portion 104. If the platen 100 is used as a stationary platen, then the mold-support structure 102, preferably, defines a passageway 103 that receives or accommodates a machine nozzle of the extruder 11 so that the machine nozzle may convey the injectable molding material from the extruder 11 into the mold cavity of the mold. The force-receiving structure 108 is offset from the structure 102. The intermediate structure 110 connects the force-receiving structure 108 to the central portion 104. The intermediate structure 110 does not connect the force-receiving structure 108 to the peripheral portion 106 (that is, the force-receiving structure 108 is or remains disconnected from the peripheral portion 106). The force-receiving structure 108 has respective tie-bar accommodation corners 149, each of which is located in respective corners of the force-receiving structure 108 of the platens 100, 200. If the platen 100 is configured as a stationary platen, tie-bar accommodation corners 149 include respective clamp-support structures 140, which are each configured to receive and accommodate the clamp actuators 16A, 16B, 16C, 16D (respectively). The tie-bar accommodation corners 149 are also known as "tie-bar ears". The tie-bar accommodation corners 149 each define respective tie-bar channels 142. The tie-bar channels 142 are configured to receive and interact with a respective tie bar (that is, a selected one of the tie bars 18A, 18B, 18C, 18D). Responsive to the force-receiving structure 108 receiving a clamping force (from respective tie bars 18A, 18B, 18C, 18D), the respective tie-bar accommodation corners 149 resist, at least in part, coplanar disorientation relative to the structure 102.

Figure 3:
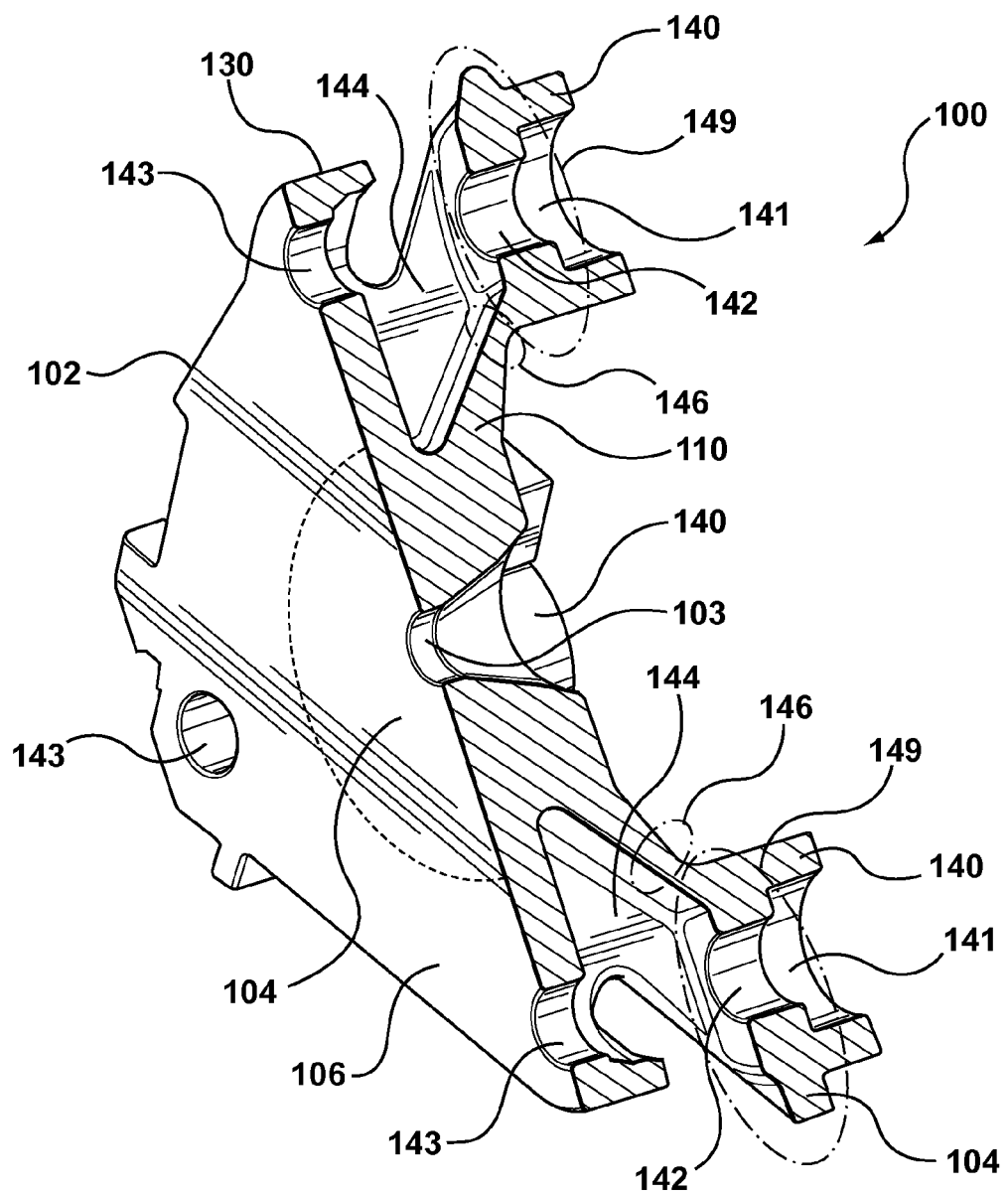
FIG. 3 is a perspective view of a cross section of the stationary platen of FIG. 1, in which the stationary platen is cut along its diagonal.

FIG. 3 is the perspective view of the cross section of the platen 100 of FIG. 1, in which the platen 100 is cut along a diagonal line that extends across opposite corners of the platen 100. Preferably, the structure 102 defines the tie-bar channels 142. The respective tie-bar accommodation corners 149 are coupled to the peripheral portion 106 of the structure 102. Preferably, ribs 144 are used to couple the peripheral portion 106 with the structure 102. According to variants (not depicted) non-rib structures are used in substitution for the ribs 144, and the non-rib structures perform the substantially the same function as the ribs 144. The intermediate structure 110 includes connection portions 146 that are coupled to the respective tie-bar accommodation corners 149.

The coupling effect associated with that of the connection portions 146 provides a stiffer coupling effect relative to the coupling effect associated with combination of: (i) the respective tie-bar accommodation corners 149, and (ii) the peripheral portion 106 of the structure 102. Preferably, the tie-bar accommodation corners 149 are supported by: (i) the peripheral portion 106 of the structure 102, and (ii) connection portions 146 associated with the intermediate structure 110; more preferably, the support provided by the peripheral portion 106 is greater than the support provided by the connection portions 146, so that responsive to the respective tie-bar accommodation corners 149 receiving a clamping force, the connection portions 146, the respective tie-bar accommodation corners 149, and the peripheral portion 106 of the structure 102 act and/or cooperate so as to resist, at least in part, coplanar disorientation between the tie-bar accommodation corners 149 and the structure 102.

An approach for resisting, at least in part, coplanar disorientation as described above is preferably achieved by arranging the ribs 144 to couple the respective tie-bar accommodation corners 149 with the peripheral portion 106. It is understood that other approaches may be used to achieve the same result as the ribs 144. In this manner, the ribs 144 provide a stiffer coupling effect (or an added support) relative to the connection portions 146, so that responsive to the respective tie-bar accommodation corners 149 receiving the clamping force, the connection portions 146 and the ribs 144 cooperate to resist, at least in part, coplanar disorientation between the respective tie-bar accommodation corners 149 and the structure 102. Preferably: (i) the connection portions 146 include a relatively thinner amount of platen material, and (ii) the ribs 144 include a relatively thicker amount of platen material (that is, relative to the thickness of the platen material associated with the connection portions 146). This arrangement permits increased "spring action" at the connection portions 146 (that is, the connection portions 146 provide reduced support) relative to the decreased "spring action" associated with the ribs 144 (that is, the ribs 144 provide increased support); under this arrangement the ribs 144 provide less spring action (or added support) relative to the connection portions 146. Preferably, the ribs 144 are respectively positioned: (i) symmetrically offset from diagonals of the structure 102, and (ii) at respective corners of the platens 100, 200.

Figure 4A:
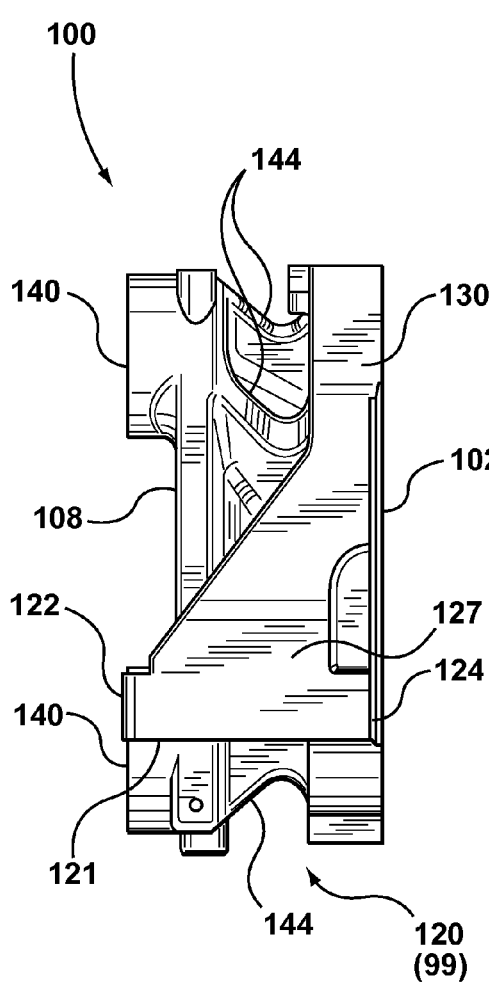
FIGS. 4A, 4B are side and top views, respectively, of the one of the stationary platen of FIG. 1 according to a third exemplary embodiment.
Figure 4B:
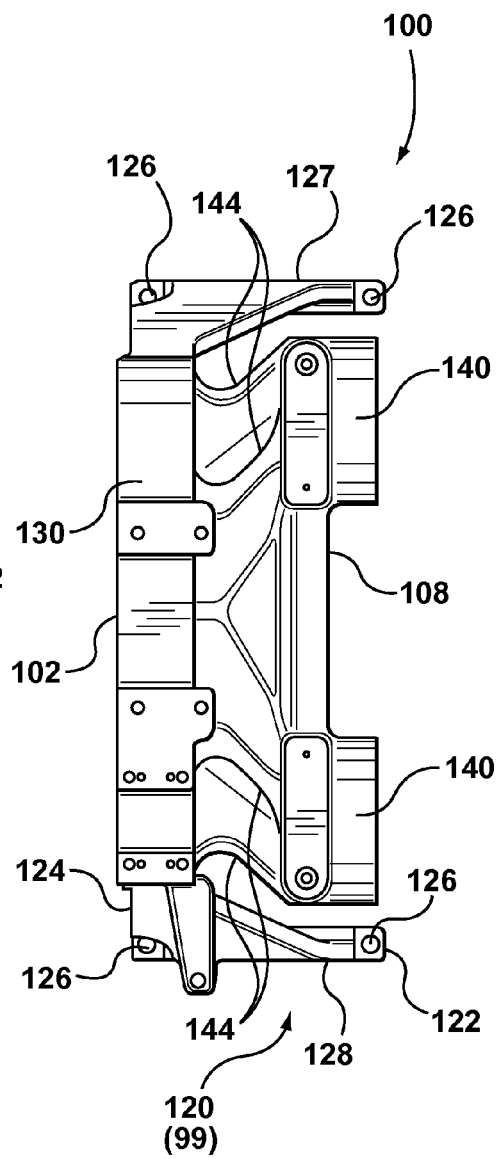

FIGS. 4A, 4B are the side and the top views, respectively, of the platen 100 of FIG. 1 according to the third exemplary embodiment. The platen 100 includes an anti-tilt structure 120 that is supportable by the frame 12. The anti-tilt structure 120 connects to the structure 102 via a connecting portion 124, and (preferably) extends from the structure 102. In the case of the platen 100 (if the platen 100 is used as a stationary platen), the anti-tilt structure 120 is fixedly connected to the frame 12. In the case of the platen 200 (if the platen 200 is used as a moveable platen), the anti-tilt structure 120 slidably engages the frame 12 so that the platen 200 may be moveable. Preferably, the anti-tilt structure 120 extends from the structure 102 toward the force-receiving structure 108 (preferably, the anti-tilt structure 120 extends past the force-receiving structure 108). The anti-tilt structure 120 connects to the peripheral portion 106 of the structure 102. It will be appreciated that a platen may be retrofitted with the anti-tilt structure 120, and in this case, the anti-tilt structure 120 may be sold and/or installed as a component 99. In operation, the anti-tilt structure 120 suppresses, at least in part, tilting of the structure 102 responsive to: (i) the anti-tilt structure 120 interacting with the frame 12 and (ii) the structure 102 supporting a mold (not depicted).

Figure 5:
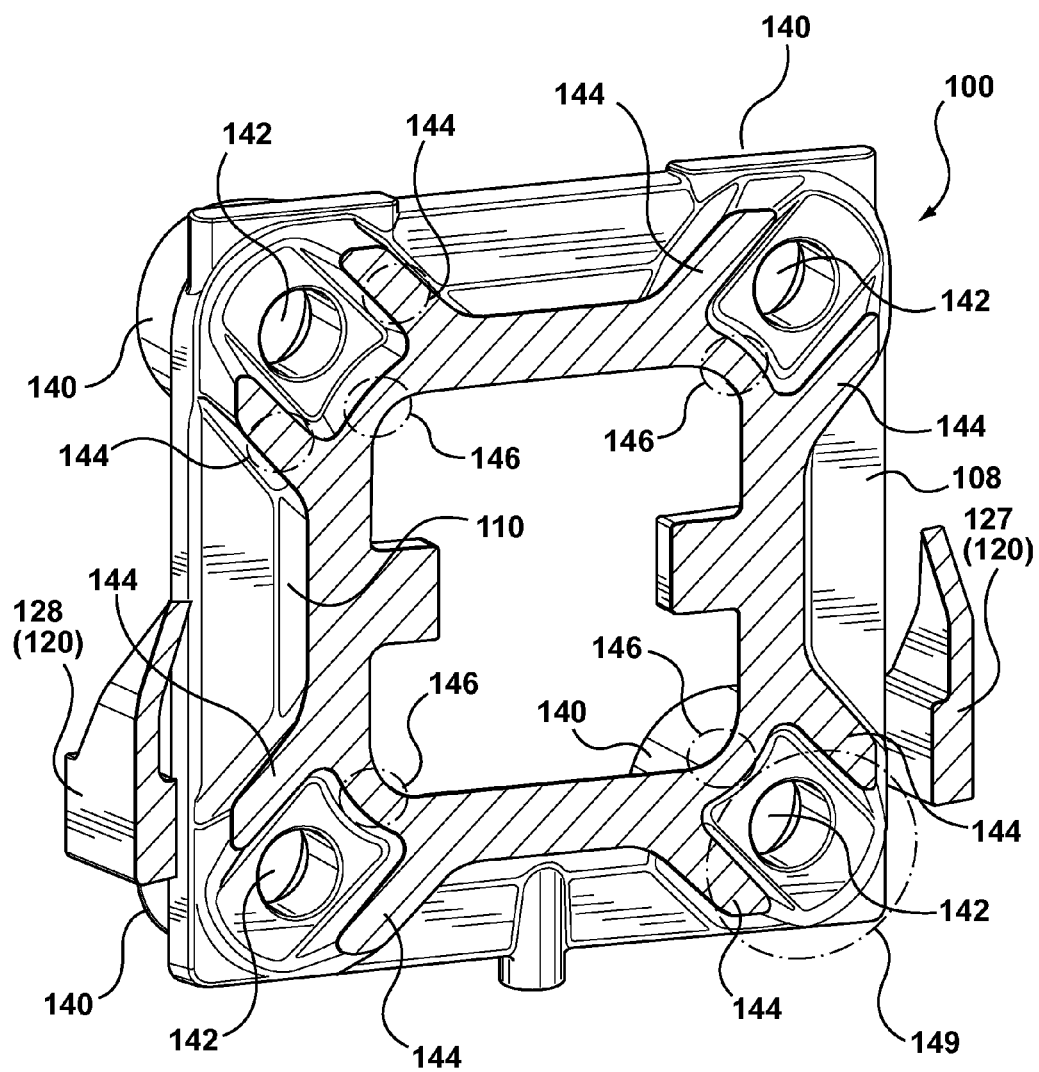
FIGS. 5, 6, 7 are perspective slice views, each of varying thickness, of the stationary platen of FIG. 1 according to a fourth exemplary embodiment.
Figure 6:
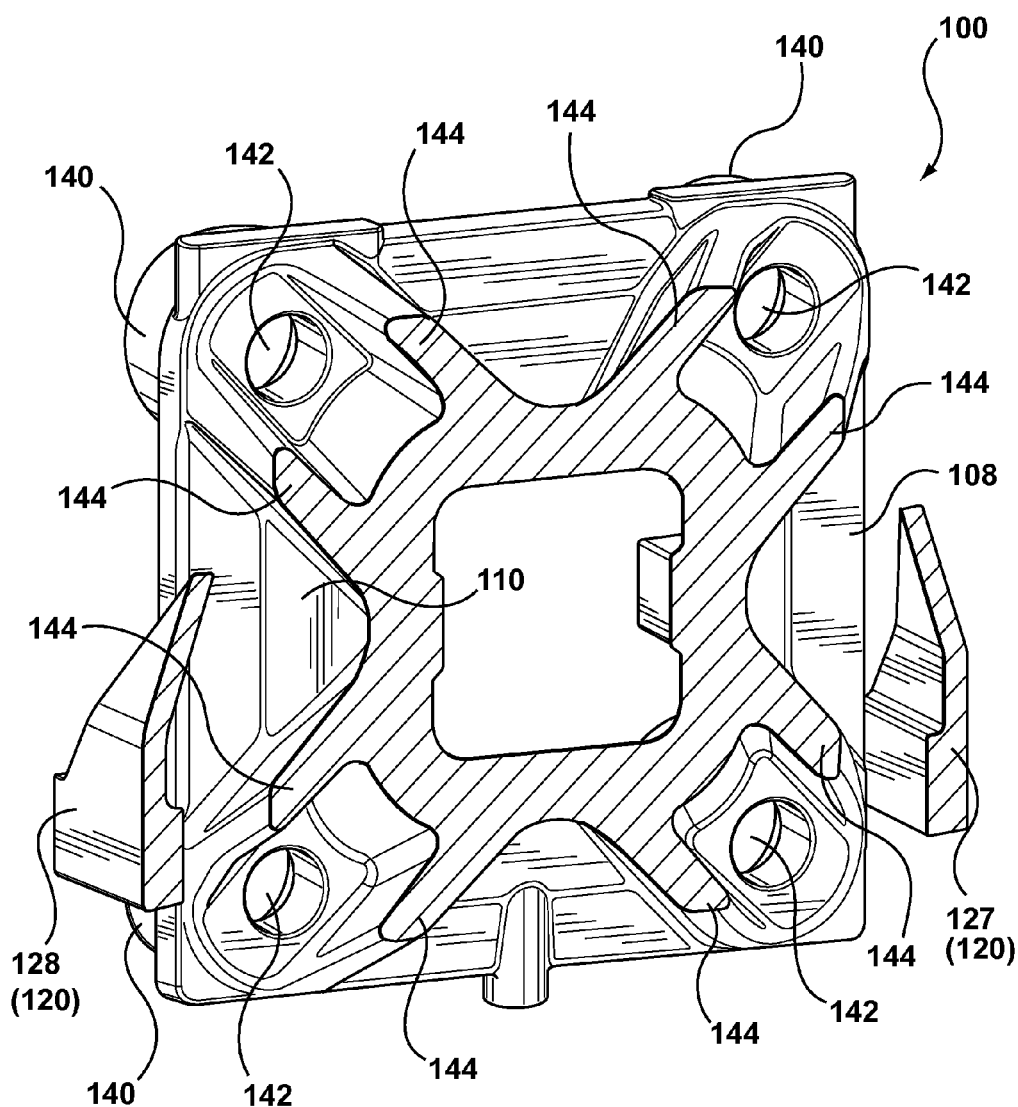
Figure 7:
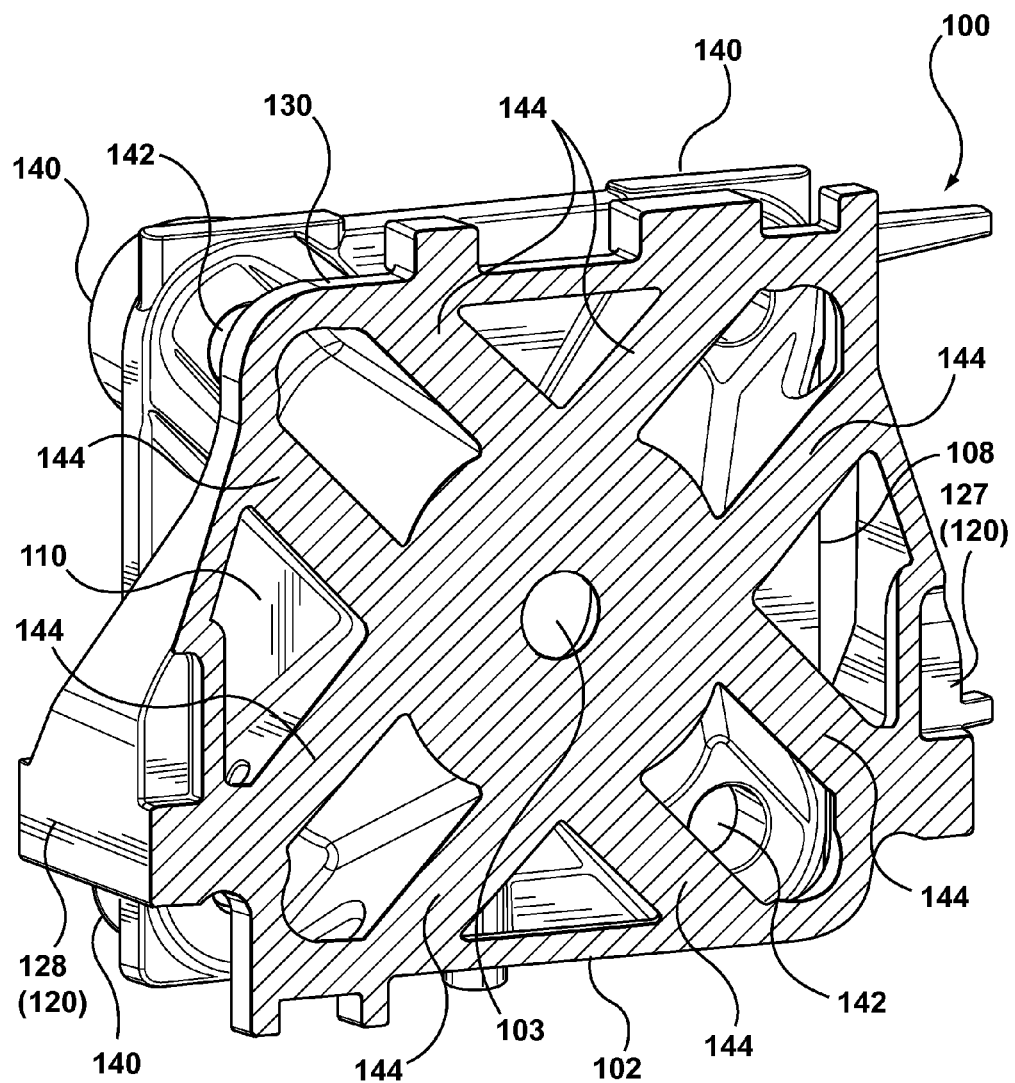

FIGS. 5, 6, 7 are the perspective slice views, each of varying thickness, of the platen 100 of FIG. 1 according to the fourth exemplary embodiment. Referring to FIG. 5, the force-receiving structure 108 forms a frame-shaped structure, so that the weight of the platen 100 may be reduced. According to a variant (not depicted), the force-receiving structure 108 forms a plate-like structure (however, weight may be increased in this embodiment). A technical effect of weight reduction is that the platen 100 becomes easier to move, and thereby: (i) less energy may be expended to move the platen 100, and (ii) the platen 100 may be moved faster (which may improve the cycle time of the system 10). The intermediate structure 110 connects the force-receiving structure 108 to the central portion 104. The peripheral portion 106 of the structure 102 is not connected to the intermediate structure 110. The ribs 144 are positioned offset on both sides of respective diagonals associated with the force-receiving structure 108. Preferably, the ribs 144 are aligned parallel to, and offset from, the diagonals. The ribs 144 extend and merge with the intermediate structure 110. Preferably, the anti-tilt structure 120 includes: (i) a first wing 127, and (i) a second wing 128, each of which are attached to opposite vertical sides of the platen 100. The force-receiving structure 108 defines respective tie-bar accommodation corners 149. The connection portions 146 couple the respective tie-bar accommodation corners 149 to the intermediate structure 110. The ribs 144 couple the force-receiving structure 108 to the peripheral portion 106 of the structure 102. Preferably, the coupling effect between: (i) the ribs 144 and (ii) the force-receiving structure 108 is softer (that is, more springy or less support) relative to the coupling effect between: (i) the connection portions 146 and the tie-bar accommodation corners 149. This effect is achieve, preferably, by having the connection portions 146 use thinner platen material relative to the ribs 144 that use thicker platen material. Referring to FIG. 6, the width of the ribs 144 becomes wider as the ribs 144 extend toward the structure 102. Referring to FIG. 7, the width (side to side thickness) of the ribs 144 is, preferably, widest at the location where the ribs 144 merge with the structure 102.

A wall 130 is attached to and extends away from the peripheral portion 106 of the structure 102. The wall 130 stiffens, at least in part, the structure 102. The wall 130 extends along, at least in part, the peripheral portion 106. The wall 130 substantially encompasses or extends along the peripheral portion 106 (along a top side of the platen 100) from the first wing 127 to the second wing 128.

Figure 8:
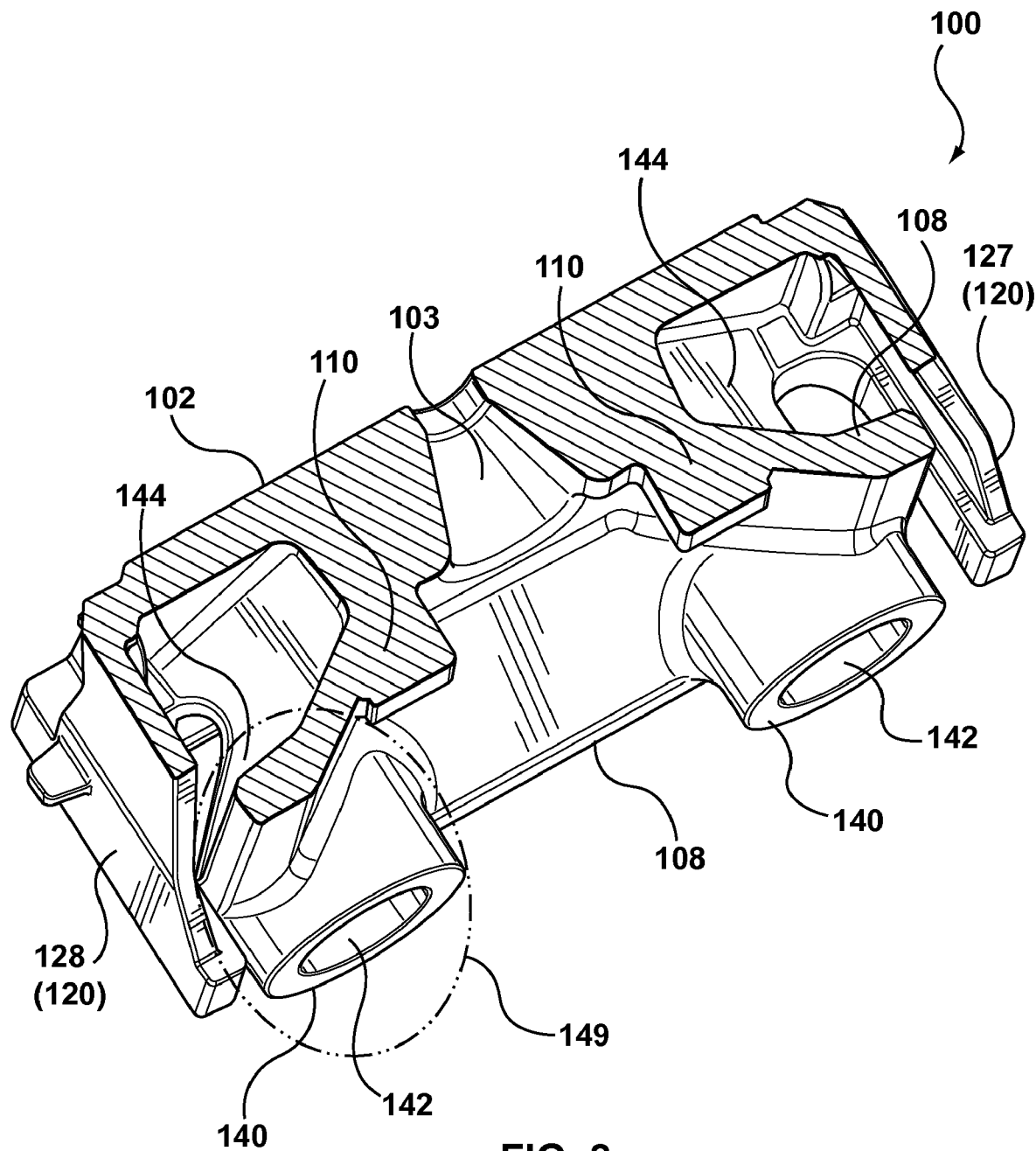
FIG. 8 is a perspective view of a cross section of the stationary platen of FIG. 1, in which the stationary platen is cut from side to side.

FIG. 8 is the perspective view of the cross section of the platen 100 of FIG. 1, in which the platen 100 is cut across opposite vertically extending sides. Preferably, the first wing 127 and the second wing 128 extend from the structure 102 toward the force-receiving structure 108. Preferably, the first wing 127 and the second wing 128 extend, relative to the force-receiving structure 108, past: (i) the back side of the force-receiving structure 108, and/or (ii) the opposite vertical sides of the force-receiving structure 108.

Figure 9:
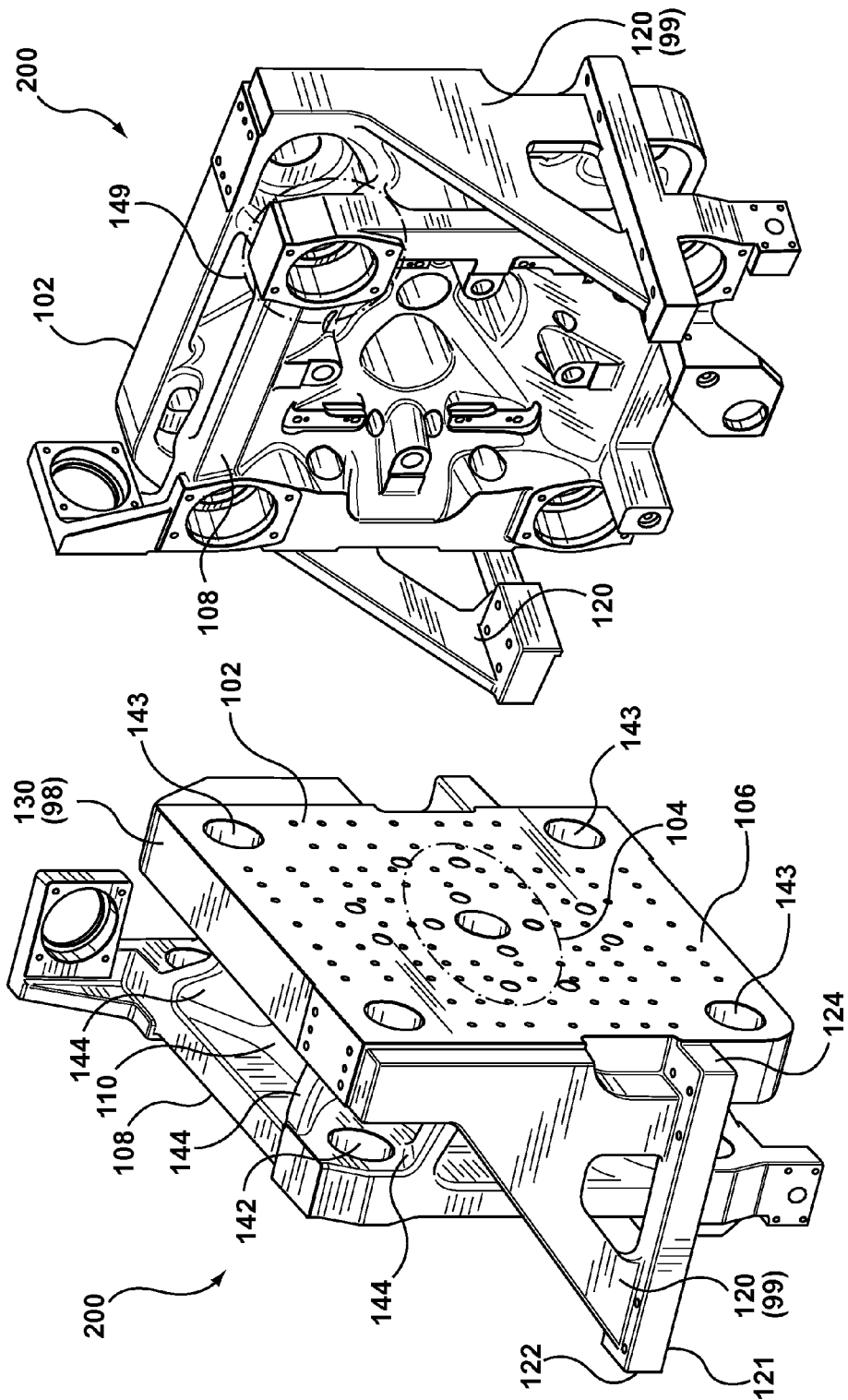
FIGS. 9A, 9B are front and back perspective views, respectively, of the movable platen of FIG. 1 according to a fifth exemplary embodiment.

FIGS. 9A, 9B are the front and the back perspective views, respectively, of the platen 200 of FIG. 1 according to the fifth exemplary embodiment. If the platen 200 is configured and used as a movable platen, the respective tie-bar accommodation corners 149 are configured to receive and accommodate the mechanisms 14A, 14B, 14C, 14D respectively. The mechanisms 14A, 14B, 14C, 14D are each configured to: (i) receive the tie bars 18A, 18B, 18C, 18D respectively, and (ii) to lock and unlock the tie bars 18A, 18B, 18C, 18D respectively relative to respective tie-bar accommodation corners 149. It is understood that any one selected platen of the platens 100, 200 may accommodate the mechanisms 14A, 14B, 14C, 14D, while the other selected platen of the platens 100, 200 may be configured to accommodate the clamp actuators 16A, 16B, 16C, 16D. It is preferred that the platen 100 is configured to accommodate the clamp actuators 16A, 16B, 16C, 16D, while the platen 200 is configured to accommodate the mechanisms 14A, 14B, 14C, 14D.

Figure 10:
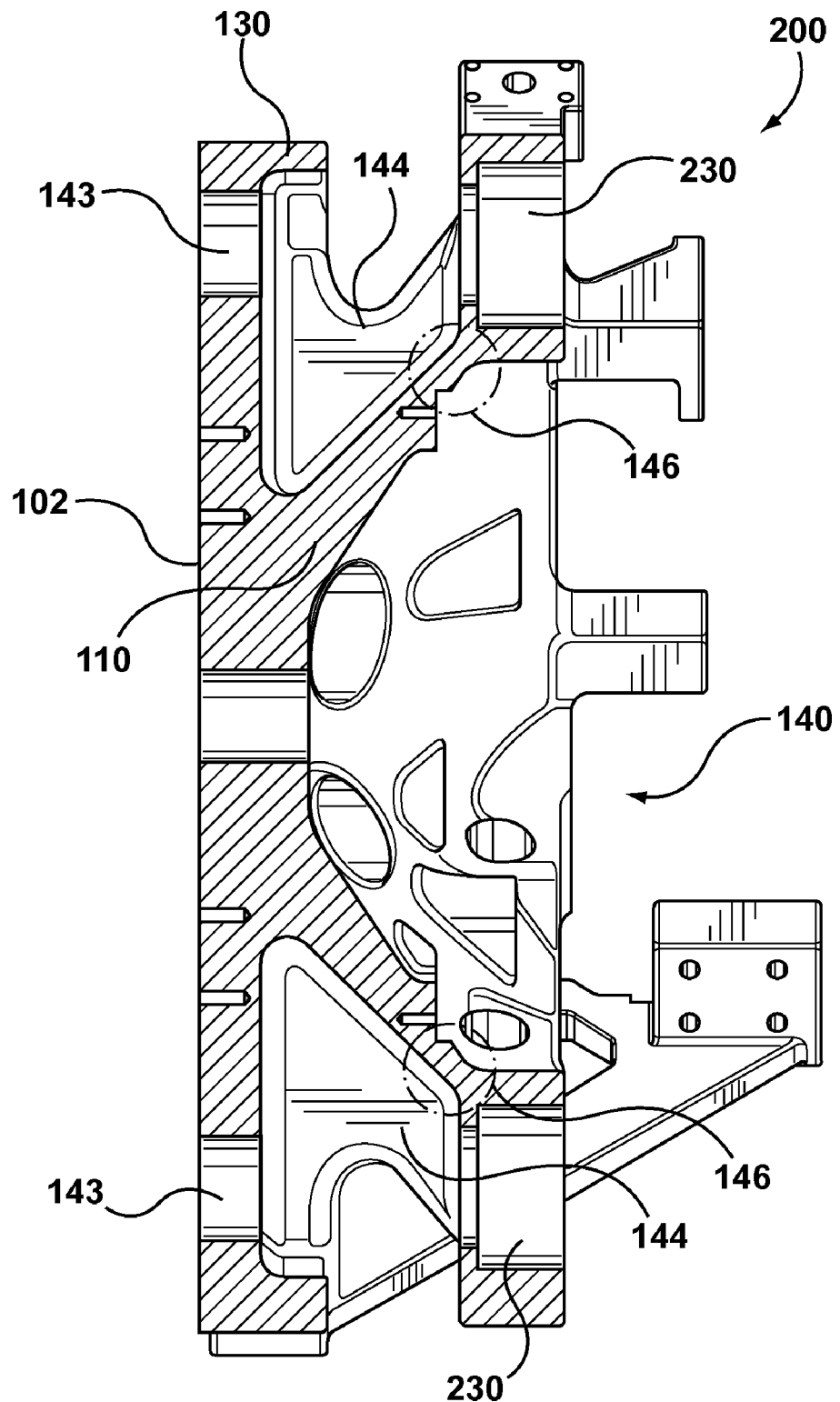
FIG. 10 is a perspective view of a cross section of the movable platen of FIG. 1, in which the movable platen is cut along its diagonal.

FIG. 10 is the perspective view of the cross section of the platen 200 of FIG. 1, in which the platen 200 is cut along a diagonal that extends between opposite corners of the platen 200. The intermediate structure 110 includes the connection portions 146 that are connected to the corners of the force-receiving structure 108. The four corners of the force-receiving structure 108 of the platen 200 each have accommodation features 230 that are each configured to accommodate respective mechanisms 14A, 14B, 14C, 14D. The mechanisms 14A, 14B, 14C, 14D are configured to interact with respective tie bars 18A, 18B, 18C, 18D. The connection portions 146 uses a relatively a thinner section or portion of platen material relative to the ribs 144 that use a relatively thicker section of platen material.

Figures 11A, 11B:
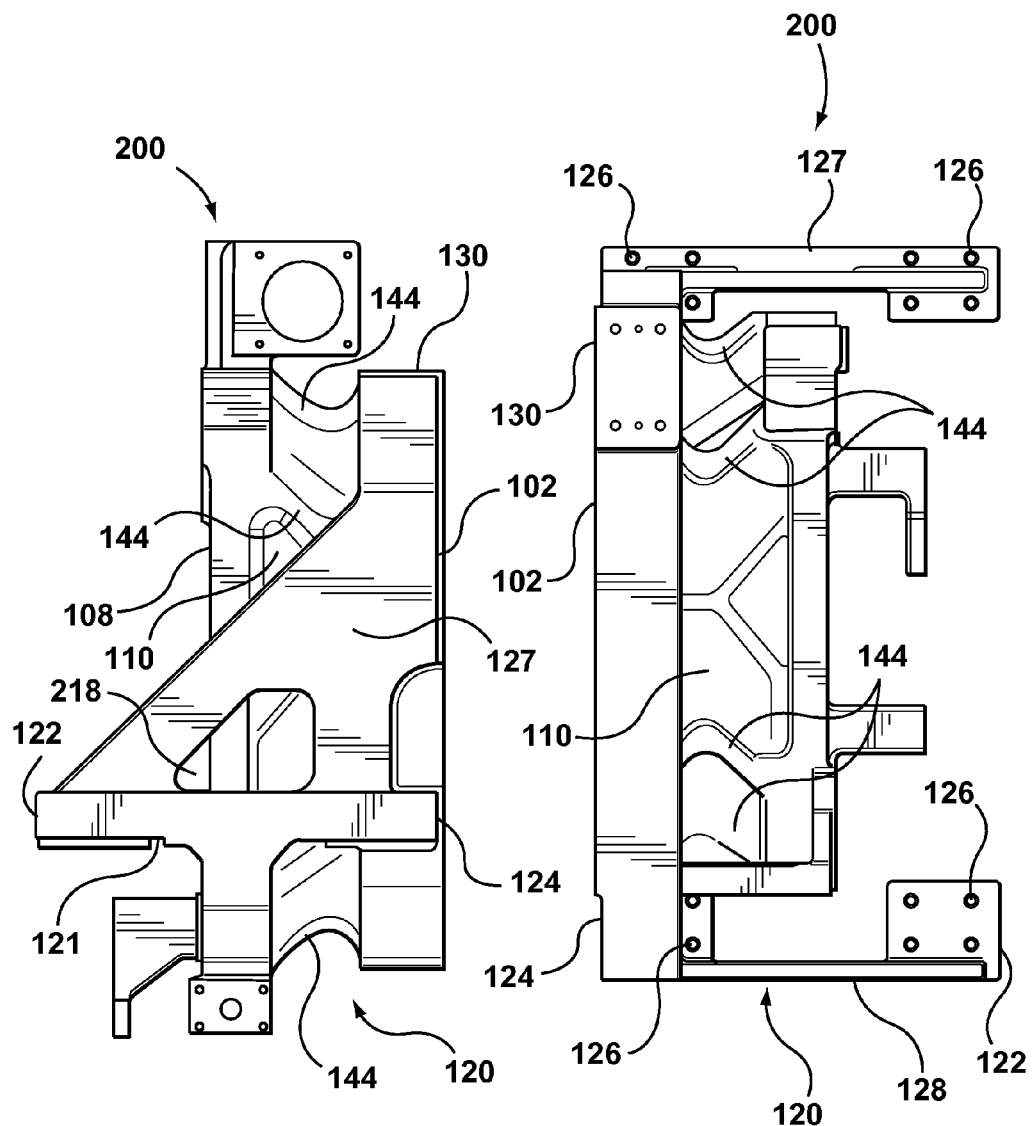
FIGS. 11A, 11B are side and top views, respectively, of the movable platen of FIG. 1.

FIGS. 11A, 11B are the side view and the top view, respectively, of the platen 200 of FIG. 1. The first wing 127 and the second wing 128 each includes a base support plate 122 that is positioned offset (preferably rearwardly offset) relative to the structure 102. The base support plate 122 defines a set of holes 126 that permit attachment of the wings 127, 128 to a slidable structure so as to permit slidable movement of the platen 200 relative to the frame of the system 10. In the case of platen 100 (if the platen 100 were configured to be a stationary platen), the holes 126 permit the platen 100 to be bolted to the frame 12 of the system 10. The first wing 127 and the second wing 128 extend behind the structure 102 and past the force-receiving structure 108. Preferably, the first wing 127 and the second wing 128 are each triangular shaped so as to includes: (i) an apex portion connected to respective vertical sides of the structure 102, and (ii) an extended base bottom portion 121 that is interactable with rails of the frame 12. The second wing 128 and the first wing 127 define a respective channel 218 (or an opening) that functions to stiffen the first wing 127 and the second wing 128, thereby reducing the weight of the wings 127, 128.

Figure 12:
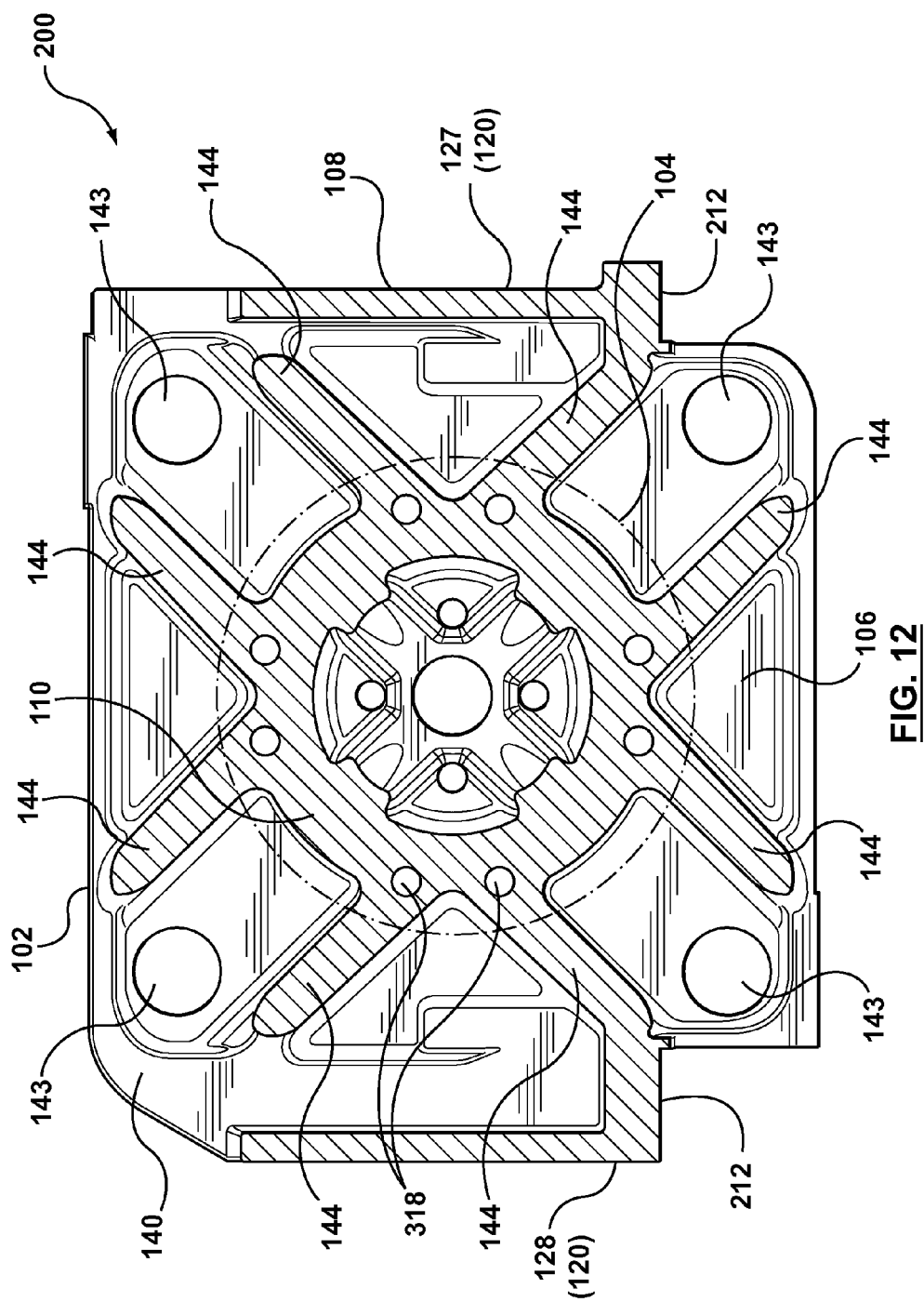
FIG. 12 is a frontal view of a slice of the movable platen of FIG. 1.

FIG. 12 is the frontal view of a slice of the platen 200 of FIG. 1. The slice passes through the intermediate structure 110. The structure 102 is depicted. The central portion 104 is connected to the intermediate structure 110. The peripheral portion 106 is not connected to the intermediate structure 110. The ribs 144 are positioned offset on both sides of respective diagonals of the structure 102, and the ribs 144 are aligned parallel to the diagonals. The ribs 144 merge with the intermediate structure 110. The structure 102 mountably supports the moveable mold portion. If the platen 200 is used as a moveable platen, the structure 102 defines at least one channel 318 (typically, a plurality of channels 318 is defined). The channel 318 permits slidable movement of an ejector rod (not depicted) through the structure 102. Typically, there is one ejector rod per channel. The moveable mold portion of the mold (not depicted) also defines a channel that is to be aligned with the channel 318 once the moveable mold portion has been attached to the structure 102, so that the ejector rod may then be slidably moveable through the structure 102 and the moveable mold portion. In this manner, a molded article may be ejected from the moveable mold portion by the ejector rod once an ejector rod actuation mechanism (not depicted, and not in the scope of the present invention) is used to actutably move the ejector rod.

The anti-tilt structure 120 includes the second wing 128 and the first wing 127. The second wing 128 is placed on a vertically-extending side of the structure 102. The first wing 127 is placed on another vertically-extending side of the structure 102. Preferably, the wall 130 extends from the first wing 127 along the top side of the structure 102 to the second wing 128. According to a variant, the wall 130 extends from the first wing 127 along the top side and the bottom side of the structure 102 to the second wing 128. In the case of the platen 200, the bottom sections 212 of the first wing 127 and the second wing 128 are slidably supported by rails of the frame 12. The structure 102 defines the tie-bar channels 142. According to a variant (not depicted), the structure 102 defines notches that accommodate the tie bars 18A, 18B, 18C, 18D. It is understood that the meaning of the tie-bar channels 142 encompasses: (i) pass-through holes defined by the structure 102, (ii) the force-receiving structure 108, and/or (iii) notches defined by the structure 102 or the force-receiving structure 108.

Figure 13B:
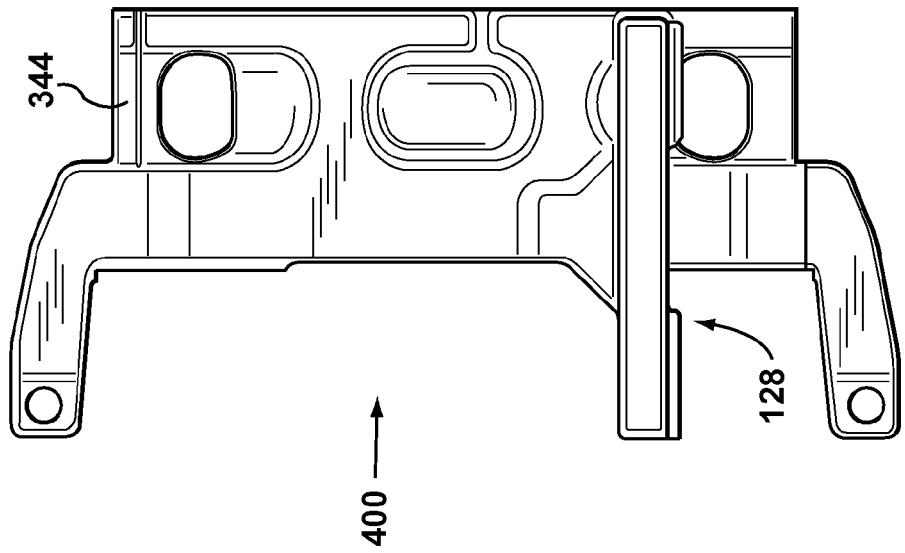
FIGS. 13A, 13B are side plan views of a stationary platen and moving platen, respectively, according to a sixth exemplary embodiment.
Figure 13A:
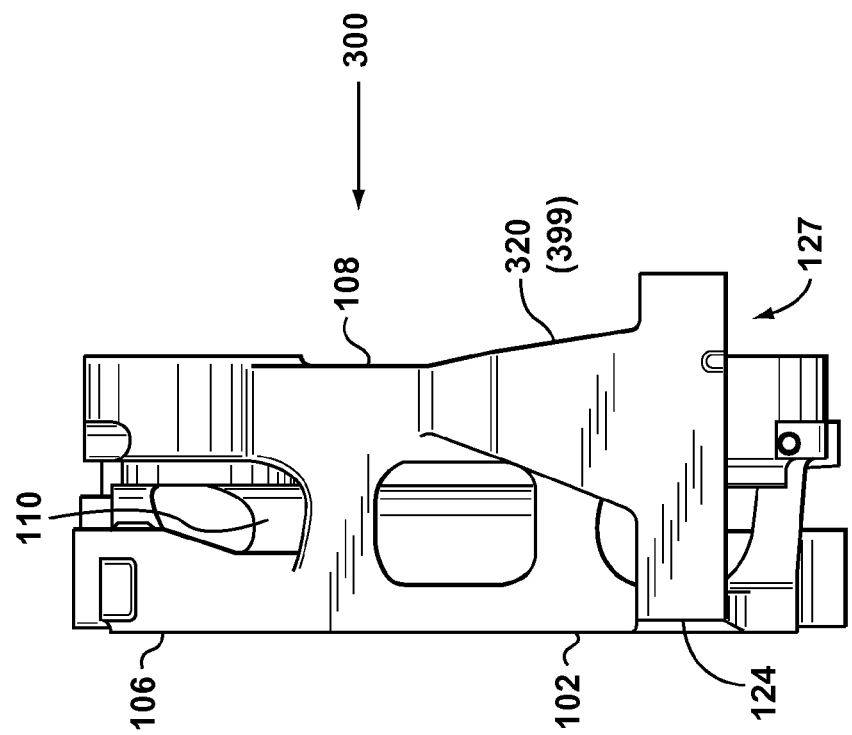
Figure 14:
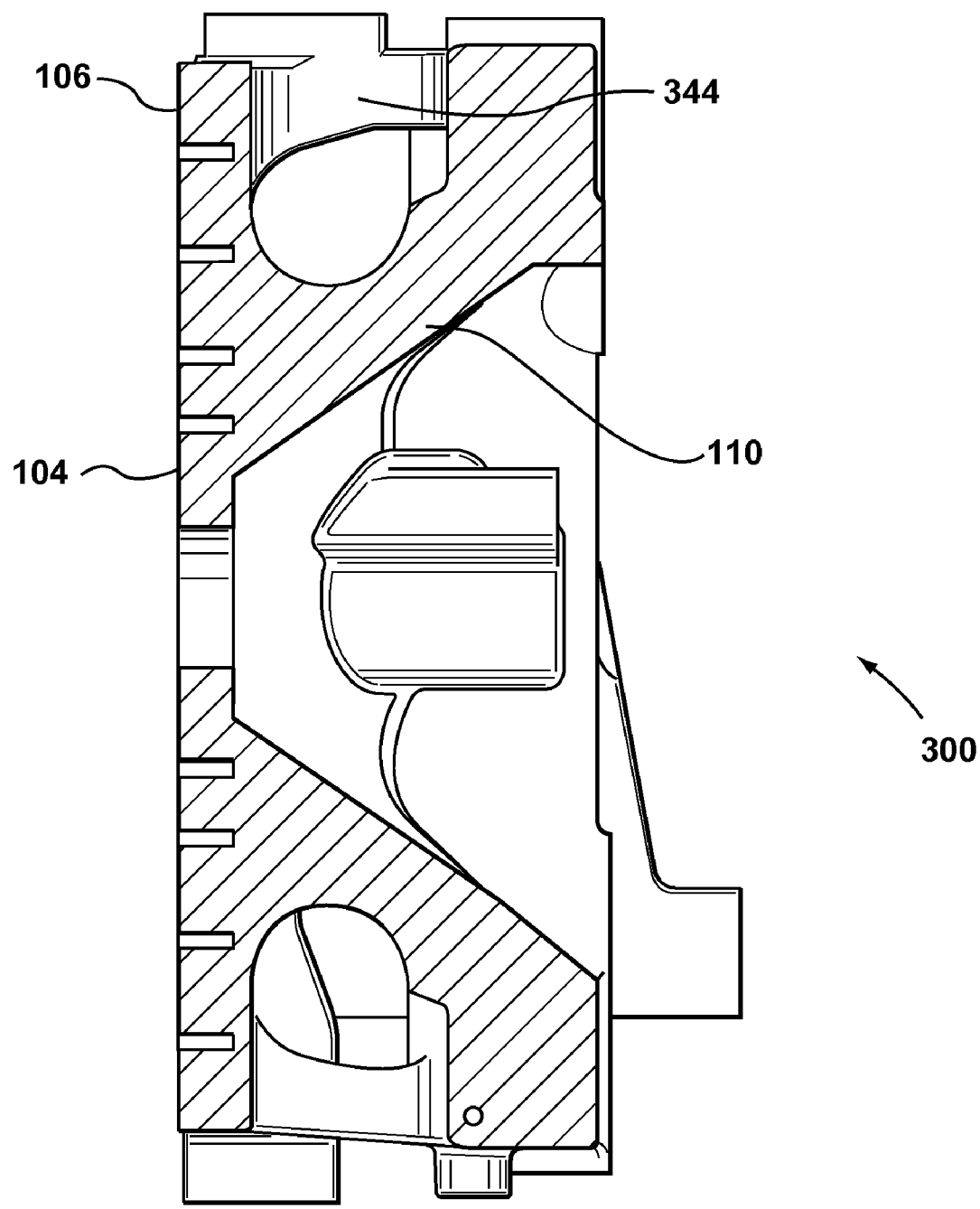
FIG. 14 is a side slice view of the moving platen of FIG. 13B.
Figure 15:
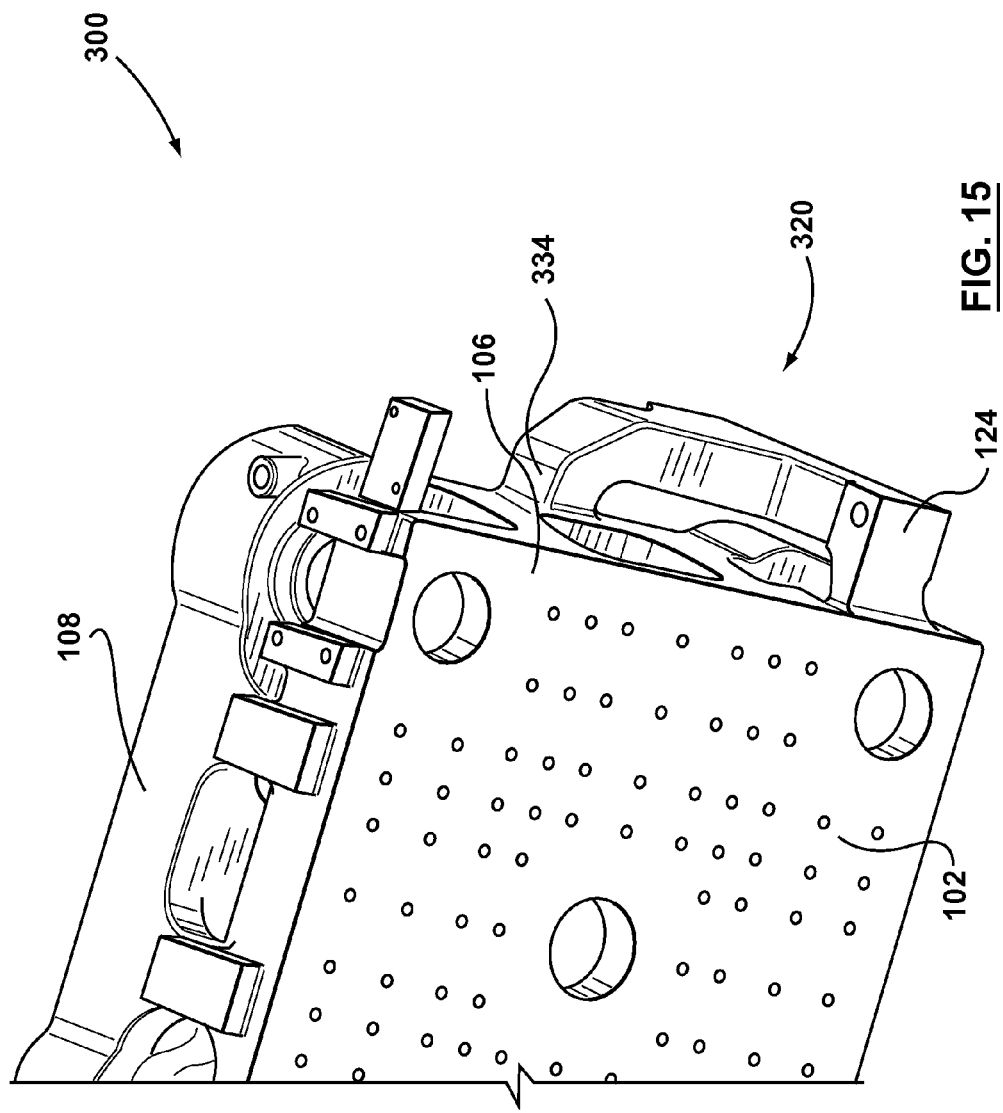
FIG. 15 is a perspective view of the moving platen of FIG. 13B.

Referring now to FIGS. 13A and 13B, an alternate embodiment of the invention is shown generally at 300 and 400. FIGS. 13A, 13B are side plan views, of a stationary platen 300 and a moving platen 400, respectively, according to another exemplary embodiment. The platen 300 and the platen 400 share similar structures or components to platens 100, 200, and as such those similar structures or components are identified in the drawings by usage of similar component or part reference numerals; therefore, dissimilar structural elements or components that are unique to either of the platens 300, 400 are identified with dissimilar part or component numerals. The platen 300 includes: (i) a mold-support structure 102, (ii) a force-receiving structure 108, and (iii) an intermediate structure 110. The force-receiving structure 108 is offset from the structure 102. The intermediate structure 110 connects the force-receiving structure 108 to the central portion 104 (FIG. 14). The intermediate structure 110 does not connect the force-receiving structure 108 to the peripheral portion 106 (that is, the force-receiving structure 108 is or remains disconnected from the peripheral portion 106).

The platen 300 includes an anti-tilt structure 320 that is supportable by the frame 12 (FIG. 1). Preferably, the anti-tilt structure 320 includes: (i) a first wing 127, and (i) a second wing 128, each of which are attached to opposite vertical sides of the platen 300. The anti-tilt structure 320 connects to the structure 102 via a connecting portion 124, and extends from the structure 102. In the case of the platen 300 (if the platen 300 is used as a stationary platen), the anti-tilt structure 320 is fixedly connected to the frame 12. In the case of the platen 400 (if the platen 400 is used as a moveable platen), the anti-tilt structure 320 slidably engages the frame 12 so that the platen 400 may be moveable. Preferably, the anti-tilt structure 320 extends from the connecting portion 124 attached to structure 102 towards and is connected to the force-receiving structure 108 via a second connecting portion 334. Preferably, the anti-tilt structure 120 extends past the force-receiving structure 108 prior to connecting with the second intermediary portion 334. The anti-tilt structure 320 connects to the peripheral portion 106 of the structure 102. It will be appreciated that a platen may be retrofitted with the anti-tilt structure 320, and in this case, the anti-tilt structure 320 may be sold and/or installed as a component 399. In operation, the anti-tilt structure 320 suppresses, at least in part, tilting of the structure 102 responsive to: (i) the anti-tilt structure 320 interacting with the frame 12 and (ii) the structure 102 supporting a mold (not depicted).

Preferably, arched ribs 344 are used to couple the peripheral portion 106 with the structure 108. The arched ribs 344 are fully detattached to intermediary portion 110, thereby reducing deflection to peripheral portion 106. As with the previously described embodiment, the connection portions 146 and the arched ribs 344 cooperate to resist, at least in part, coplanar disorientation between the respective tie-bar accommodation corners 149 and the structure 102. Preferably, the arched ribs 344 are spaced positionally around peripheral portion 106, and generally perpendicular to both structure 102 and structure 108.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A platen of a molding system having a frame, the platen comprising:

a mold-support structure having a central portion, the mold-support structure having a peripheral portion surrounding the central portion;

a force-receiving structure offset from the mold-support structure;

an intermediate structure connecting the force-receiving structure to the central portion but disconnecting the force-receiving structure from the peripheral portion;

the force-receiving structure having respective tie-bar accommodation corners each defining a respective tie-bar channel configured to receive a respective tie bar, the respective tie-bar accommodation corners being coupled to the peripheral portion of the mold-support structure; and an anti-tilt structure being supportable by the frame, the anti-tilt structure connecting to the mold-support structure, and the anti-tilt structure extending from the mold-support structure, the anti-tilt structure connecting to the peripheral portion of the mold-support structure, the anti-tilt structure including:

a first wing, and a second wing, each of the first wing and the second wing being attached to opposite vertical sides of the platen, the first wing and the second wing extending from the mold-support structure toward the force-receiving structure, the first wing and the second wing extend, relative to the force-receiving structure, past opposite vertical sides of the force-receiving structure, wherein the respective tie-bar accommodation corners are supported by the peripheral portion of the mold-support structure, the respective tie-bar accommodation corners are supported by connection portions associated with the intermediate structure, and support provided by the peripheral portion is greater than the support provided by the connection portions.

* * * * *